United States Patent
Gibbs et al.

(10) Patent No.: US 8,001,561 B2
(45) Date of Patent: Aug. 16, 2011

(54) SYSTEM AND METHOD FOR AUTOMATICALLY RATING VIDEO CONTENT

(75) Inventors: Simon J. Gibbs, San Jose, CA (US); Bottyán Németh, Budapest (HU); Priyang Rathod, Mountain View, CA (US); Anugeetha Kunjithapatham, Sunnyvale, CA (US); Mithun Sheshagiri, Mountain View, CA (US); Phuong Nguyen, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 484 days.

(21) Appl. No.: 12/120,217

(22) Filed: May 13, 2008

(65) Prior Publication Data

US 2009/0133048 A1    May 21, 2009

Related U.S. Application Data

(60) Provisional application No. 60/989,413, filed on Nov. 20, 2007.

(51) Int. Cl.
*H04N 7/16* (2011.01)
*H04N 5/455* (2006.01)

(52) U.S. Cl. ............... 725/14; 725/9; 725/10; 725/11; 725/46; 725/47

(58) Field of Classification Search ............... 725/9–11, 725/14, 46, 47
See application file for complete search history.

(56) References Cited

U.S. PATENT DOCUMENTS

| | | | | | |
|---|---|---|---|---|---|
| 5,798,785 | A | * | 8/1998 | Hendricks et al. | 725/46 |
| 5,867,226 | A | * | 2/1999 | Wehmeyer et al. | 725/46 |
| 6,088,722 | A | * | 7/2000 | Herz et al. | 709/217 |
| 6,177,931 | B1 | * | 1/2001 | Alexander et al. | 725/52 |
| 6,637,029 | B1 | * | 10/2003 | Eilat et al. | 725/46 |
| 6,898,762 | B2 | * | 5/2005 | Ellis et al. | 715/716 |
| 7,096,486 | B1 | * | 8/2006 | Ukai et al. | 725/58 |
| 7,117,518 | B1 | * | 10/2006 | Takahashi et al. | 725/86 |
| 7,167,895 | B1 | * | 1/2007 | Connelly | 709/203 |
| 7,296,284 | B1 | * | 11/2007 | Price et al. | 725/46 |
| 2002/0056087 | A1 | * | 5/2002 | Berezowski et al. | 725/9 |
| 2002/0112239 | A1 | * | 8/2002 | Goldman | 725/46 |
| 2003/0020744 | A1 | * | 1/2003 | Ellis et al. | 345/723 |
| 2003/0088872 | A1 | * | 5/2003 | Maissel et al. | 725/46 |
| 2003/0149980 | A1 | * | 8/2003 | Hassell et al. | 725/39 |

(Continued)

OTHER PUBLICATIONS

Ali et al., "TiVo: Making Show Recommendations Using a Distributed Collaborative Filtering Architecture," Industry/Government Track Paper, Aug. 2004 (pp. 394-401).

*Primary Examiner* — Son P Huynh
(74) *Attorney, Agent, or Firm* — Beyer Law Group LLP

(57) ABSTRACT

System and method for automatically rating the content of video media based on video operations performed on a media device and in reference to a plurality of rating rules are provided. Usage of the media device is continuously monitored and user actions with respect to operating the video media on the media device are automatically logged. Each rating rule includes a device usage pattern with respect to operating videos on the media device and a rating action indicating adjustments to content ratings of the videos based upon characteristics described by the device usage pattern that are inferred from the recorded user inputted video control operations. When the device usage pattern of a rating rule is inferred from one or more user actions operating a piece of video media directly on the media device, the content rating of the piece of video media is adjusted based on the rating rule.

40 Claims, 4 Drawing Sheets

U.S. PATENT DOCUMENTS

| | | | |
|---|---|---|---|
| 2003/0226146 A1* | 12/2003 | Thurston et al. | 725/46 |
| 2004/0073923 A1* | 4/2004 | Wasserman | 725/46 |
| 2005/0076365 A1* | 4/2005 | Popov et al. | 725/46 |
| 2005/0149964 A1* | 7/2005 | Thomas et al. | 725/9 |
| 2005/0204388 A1* | 9/2005 | Knudson et al. | 725/58 |
| 2006/0010470 A1* | 1/2006 | Kurosaki et al. | 725/46 |
| 2007/0154163 A1* | 7/2007 | Cordray | 386/52 |
| 2007/0157220 A1* | 7/2007 | Cordray et al. | 725/9 |
| 2007/0169148 A1* | 7/2007 | Oddo et al. | 725/46 |
| 2007/0186234 A1* | 8/2007 | Cormack et al. | 725/28 |
| 2007/0186243 A1* | 8/2007 | Pettit et al. | 725/46 |
| 2007/0204287 A1* | 8/2007 | Conradt et al. | 725/28 |
| 2007/0256093 A1* | 11/2007 | Hiler | 725/28 |
| 2009/0077589 A1* | 3/2009 | Boyer et al. | 725/46 |

* cited by examiner

SYSTEM AND METHOD FOR AUTOMATICALLY RATING VIDEO CONTENT

CROSS REFERENCE TO RELATED APPLICATION

This patent application takes priority under 35 U.S.C. 119(e) to U.S. Provisional Patent Application No. 60/989,413, filed on Nov. 20, 2007 entitled "A PERSONALIZED VIDEO RECOMMENDER SYSTEM" by Gibbs et al., which is hereby incorporated by reference in its entirety and for all intents and purposes.

FIELD OF THE INVENTION

The present invention generally relates systems and methods for automatically rating video content on individual media devices. More specifically, the present invention relates to automatically rating video content based on operations with respect to the video content on the individual consumer media devices and in reference to one or more predefined rating rules.

BACKGROUND OF THE INVENTION

There is a vast amount of video media available to the consumers. From films or movies to broadcast television programs to cable or satellite television programs to home movies or user-created video clips, there are many repositories, databases and other sources from which the consumers may choose and obtain video media in various formats. The amount of video media available to the consumers continues to grow at a very high rate. Broadcast, cable, or satellite companies often provide hundreds of different channels for the consumers to choose from. Movie rental companies such as Netflix and Blockbuster have tens, even hundreds, of thousands of titles on DVDs (digital video disc) or video cassettes. More recently, the Internet has also lent its unique capability and become a great repository and distribution channel for video media world-wide. Sites such as YouTube have immense video collections, often millions of video clips, contributed by users from all over the world.

Of course, the content of these videos vary greatly. As a result, various rating systems with respect to the content or popularity of the videos have been developed to help the consumers make informed choices. For example, a star rating system is often used by movie critics and viewers to rate movies or films, where the more stars a movie or film receives, the higher the rating. For television programs, the Nielsen Ratings is a well-known system that measure audience viewing results. Movie rental companies such as Netflix or Blockbuster and Internet sites such as YouTube or Amazon allow viewers to rate and/or comment on individual movies or video clips manually, such as by selecting a number of stars for each video rated, and these individual ratings are combined or averaged to provide an overall rating for the particular video. These rating systems often reflect the popularity of the videos.

Video ratings, once obtained, may be used for different purposes. People may choose videos based on their respective ratings. Sponsors, rental companies, or Internet sites may recommend videos that have received higher ratings to their customers or users. Therefore, it is generally desirable for the ratings to reflect the viewers' opinions as closely as possible. Furthermore, individual or personal preferences often play a major role when people rate or select videos. A particular movie may be well received by one individual while disliked, even hated by another individual. Thus, a relatively personalized rating system, instead of one that combines opinions from hundreds or thousands of viewers having very different tastes, may be more desirable in some circumstances.

SUMMARY OF THE INVENTION

Broadly speaking, the present invention generally relates to automatically rating video content based on operations with respect to the video content on a media device and in reference to one or more predefined rating rules.

According to one embodiment, a consumer media device suitable for playing, recording, or controlling the playing or recording of video content, the consumer media device is one selected from a group consisting of a television, a VCR (video cassette recorder), a PVR (personal video recorder), a DVR (digital video recorder), an AV (audio/video) controller, a mobile multimedia player, a cable box, and a set top box is provided. The consumer media device comprises: a usage logger that automatically records selected user inputs to the consumer media device that are associated with at least one of playing and recording video content; and a rating engine that has a set of rating rules, the rating engine being arranged to apply the rating rules to automatically generate content ratings associated with video content processed by the consumer media device based upon (1) the user inputs detected by the usage logger, (2) program guide information received by the consumer media device, and (3) the rating rules, wherein the rating engine automatically generates content ratings for specific video content played for or recorded by or under the control of the consumer media device such that each rated piece of video content has an associated content rating.

According to another embodiment, a media device capable of supporting video operations and automatically rating content of videos that have been operated on the media device is provided. The media device comprises a device usage monitor configured to continuously monitor and automatically record user inputted video control operations performed on the media device in a usage log; a plurality of rating rules, wherein each rating rule includes a device usage pattern with respect to operating videos on the media device and a rating action indicating adjustments to content ratings of the videos based upon characteristics described by the device usage pattern that are inferred from the recorded user inputted video control operations; and a rating engine configured to automatically determine when the user inputted control operations infer a device usage pattern that falls within the scope of a particular one of the plurality of rating rules, thereby triggering the application of the particular rating rule, and automatically adjusting a content rating of a piece of video based on a rating action associated with the particular rating rule when the device usage pattern of that rating rule is inferred from at least one video operation performed directly on the media device with respect to the piece of video.

According to another embodiment, a system for automatically rating content of videos, wherein the system is a part of a consumer electronic device capable of allowing its users to view or record videos directly on the consumer electronic device is provided. The system comprises a device usage monitor configured to continuously monitor and automatically record user inputs that control video operations performed on the consumer electronic device; a data analyzer configured to analyze the recorded video operations and determine at least one operation with respect to a piece of video performed on the consumer electronic device; a plurality of rating rules, wherein each of the plurality of rating rules includes a device usage pattern with respect to operating videos on the consumer electronic and a rating action; and a rating engine configured to compare the at least one operation with respect to the piece of video against the device usage pattern of each of the plurality of rating rules and automatically adjusting a content rating of the piece of video based the rating action of one of the plurality of rating rules when the device usage pattern of that rating rule is inferred from the at least one operation with respect to the piece of video.

According to another embodiment, a method and a computer program product for automatically rating content of videos that have been operated on a media device capable of support video operations in reference to a plurality of rating rules, wherein each of the plurality of rating rules includes a device usage pattern with respect to operating videos on the media device and a rating action indicating content rating adjustments based upon characteristics described by the device usage pattern are provided. The method and computer program product comprise the steps of continuously monitoring and automatically recording video operations performed on the media device; comparing at least one video operation performed directly on the media device with respect to a piece of video against the device usage pattern of each of the plurality of rating rules; and if the device usage pattern of one of the plurality of rating rules is inferred from the at least one video operation with respect to the piece of video such that characteristics of the at least one video operation falls within a scope of the device usage pattern, automatically adjusting a content rating of the piece of video based on the rating action of that rating rule.

These and other features, aspects, and advantages of the invention will be described in more detail below in the detailed description and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
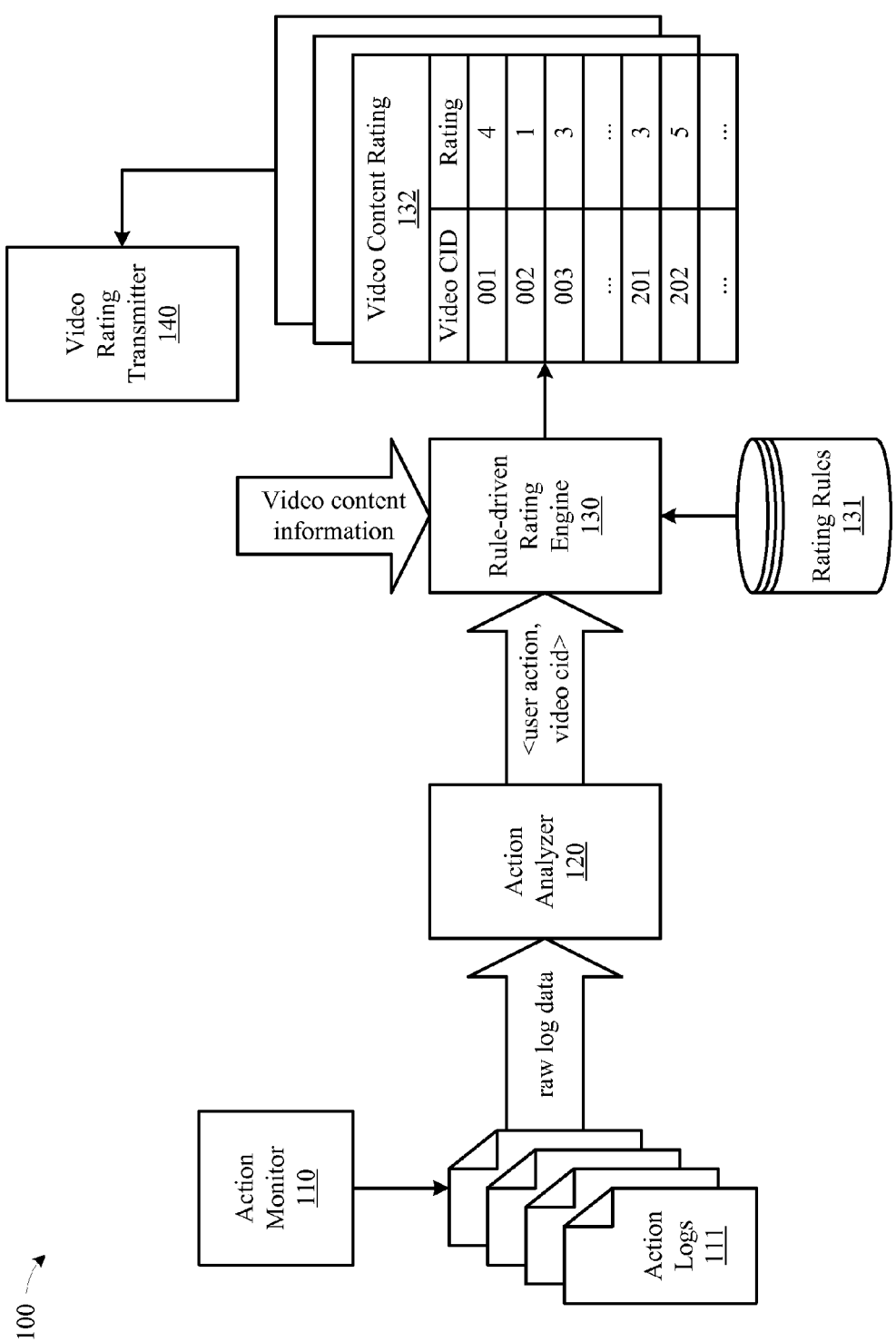
FIG. 1 illustrates a system for automatically rating the content of videos based on the operations associated with the videos on a media device and in reference to one or more predefined rating rules.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. In addition, while the invention will be described in conjunction with the particular embodiments, it will be understood that this description is not intended to limit the invention to the described embodiments. To the contrary, the description is intended to cover alternatives, modifications, and equivalents as may be included within the spirit and scope of the invention as defined by the appended claims.

According to various embodiments, systems and methods for automatically rating the content of videos that have been operated on a media device based on one or more predefined rating rules are provided. The media device is capable of supporting various video operations, such as viewing, recording, downloading, or uploading videos. The media device may be a consumer electronic device, such as a television, including CRT (Cathode ray tube), projection, LCD (liquid crystal display), plasma, or high-definition televisions, a video recorder and/or player, including VCRs (video cassette recorder), PVRs (personal video recorder), or DVRs (digital video recorder), a cable or set top box, an audio/video controller, etc. The media device may also be a mobile or personal media player or a personal computer.

Each of the predefined rating rules includes a device usage pattern that describes one or more user actions with respect to one of the video operations performed on the media device, and a rating action to be taken when the device usage pattern is inferred from one or more actions associated with operating the videos directly on the media device, i.e., the usage of the media device.

User actions with respect to operating the videos directly on the media device, i.e., the usage of the media device, are continuously and automatically monitored and logged. A device usage action refers to operating and/or controlling the media device in connection with videos, such as viewing a piece of video, recording a piece of video, downloading or uploading a piece of video, repeatedly viewing a same piece of video, sending a piece of video to another person, etc. Each device usage action may be associated with a specific piece of video whose content is identified by a unique content identifier (CID). However, it is not necessary that every device usage action is associated with a piece of video. A CID may be, for example, a combination of letters and/or digits. Actions associated with operating videos on the media device may be logged into a log file. In addition, information regarding the content of the videos that have been operated on the media device may also be logged.

A rating is associated with each piece of video that has been directly operated on the media device. The rating rates the content of the piece of video based on the type of operation(s) that has/have been performed on the media device with respect to the piece of video. More specifically, by analyzing one or more user actions associated with operating a particular piece of video on the media device and comparing the user action(s) against the device usage pattern described in each of the rating rules, if a device usage pattern of one of the predefined rating rules is inferred from the user action(s), then the rating of the piece of video is automatically adjusted based on the rating action of that rating rule. Thus, only user actions associated with operating the piece of video directly on the media device affect the content rating of that piece of video. Actions associated with the piece of video performed elsewhere, i.e., not directly on the media device, do not affect the content rating of the piece of video.

FIG. 1 illustrates a system 100 for automatically rating the content of videos based on the operations associated with the videos on a media device and in reference to one or more predefined rating rules. The system 100 is located on a media device, such as a consumer electronic device, a portable media device or player, a smart telephone, a personal digital assistant (PDA), or a personal computer, that is capable of supporting various types of video operations, such as viewing, recording, or downloading videos.

Figure 2:
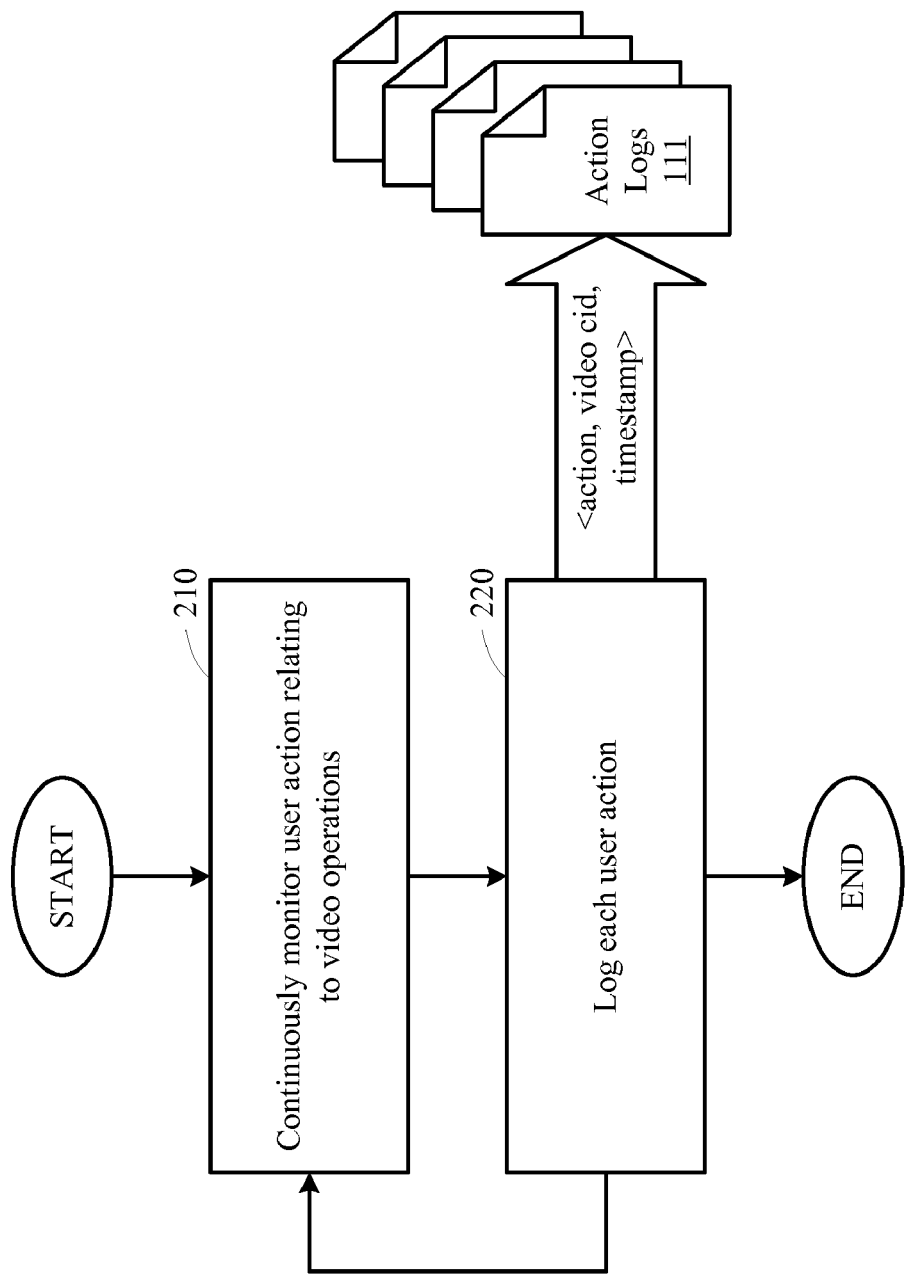
FIG. 2 illustrates a method of automatically monitoring and logging the video operations on a media device.

An action monitor 110 continuously monitors user actions or device usage with respect to video operations performed directly on the media device and automatically logs these actions in one or more action logs 111. The action monitor 110 is described in more detail in FIG. 2, which illustrates a method of automatically monitoring and logging the video operations on a media device.

The action monitor 110 continuously monitors various user actions with respect to operating the media device, and particularly user actions relating to video operations performed directly on the media device (step 210). And each user action is logged in one or more action logs 111 (step 220). Of course, the actual types of user or device usage actions involved in operating the media device often depend on the functionalities supported by the media device, i.e., the types of video operations that may be performed on the media device. In other words, the user actions or device usage would be different for different types of media devices, depending on the capabilities of each type of media devices. The user actions or device usage data corresponds to the types of video operations supported by each type of media devices. For example, if the media device is a video recorder, the actions may include recording various pieces of video using the recorder, for both live recording and scheduled recording, or viewing recorded videos. If the media device is a portable media player or a personal computer having access to the Internet, the actions may include downloading videos from the Internet for viewing or sending videos to others.

More specifically, if the media device is a television, then the user or device usage actions typically include powering on and off the television, selecting channels either by directly inputting channel numbers into the remote control device or by pushing the "channel up" or "channel down" buttons on the remote control device, increasing or decreasing the sound volume of the television by pushing the "volume up" or "volume down" buttons on the remote control device, etc.

If the media device is a video recording device, such as a PVR or DVR, then the user or device usage actions typically include selecting a channel number to be recorded, starting a live recording by pushing the "record" button on the remote control device, stopping a recording by pushing the "stop" button on the remote control device, scheduling a timed recording by inputting the start and stop time and the channel or the program ID to be recorded via the remote control device, playing a recorded piece of video by pushing the "play" button on the remote control device, skipping a portion of a piece of video being viewed by pushing the "fast forward" button on the remote control device, repeating a portion of a piece of video being viewed by pushing the "fast backward" button on the remote control device, etc. For media device such as TiVo that supports scheduled recording of multiple episodes from the same program series, the actions may also include inputting commands to schedule the recording of all the episodes from a program series that would be shown during an entire season, i.e., adding a season pass, or to delete a previously scheduled season pass, i.e., removing a season pass.

If the media device is a cable or set top box, then the user or device usage actions typically include powering on and off the box, viewing program information or channel guide by pushing the "guide" button on the remote control device, selecting channels either by directly inputting channel numbers into the remote control device or by pushing the "channel up" or "channel down" buttons on the remote control device or by choosing a channel from the channel guide listing, increasing or decreasing the sound volume of the television by pushing the "volume up" or "volume down" buttons on the remote control device, etc.

If the media device is an A/V controller, then the user or device usage actions typically include powering on and off the controller, selecting input device by selecting the appropriate audio and video inputs either directly on the controller or via a remote control device, increasing or decreasing the sound volume, etc.

If the media device is a portable media player or personal computer having a wired or wireless connection to the Internet, then the user or device usage actions typically include executing different application programs, such as a media player or web browser, to view, download, or upload video media.

Different information may be stored in the action logs 111. For example, for each log entry corresponding to a specific user action with respect to operating the media device, the action and an indication of the time that the action occurs, e.g., a timestamp, may be recorded in the action logs 111. In addition, if the action is associated with a particular piece of video, such as viewing or recording the piece of video, then the unique CID for the piece of video may also be logged in the action logs 111. The following Table 1 shows some sample entries that may be found in an action log file 111. The media device in this example is a television, and thus, the typical user actions include selecting channels or controlling sound volume. Note that not all actions are necessarily associated with a piece of video. For example, the last entry describes that the television was powered off at 17:50:03 on Feb. 4, 2008, i.e., the timestamp, and this action was not associated with any specific piece of video media because the action involved turning off the television. On the other hand, the first entry describes that the television was powered on at 17:50:03 on Feb. 4, 2008, and since the television was set to channel 2 at the time and a program was showing on channel 2 when the television was turned on, this action was associated with the video being shown on channel 2 at the time, which had a CID 9165. Similarly, since each channel had a program showing when the channel was selected, these actions were also associated with the pieces of video shown on the selected channels respectively, and the content of each piece of video may be identified by a unique CID.

TABLE 1

Sample Entries of Action Logs for a Television

| Entry | Action | Timestamp | Video CID |
|---|---|---|---|
| 1 | Power on television; current channel is 2 | 20080204 17:50:03 | 9165 |
| 2 | Push "channel up" button; current channel is 3 | 20080204 17:53:15 | 0371 |
| 3 | Input channel 6 via remote control; current channel is 6 | 20080204 17:59:32 | 1573 |
| 4 | Input channel 42 via remote control; current channel is 42 | 20080204 18:05:51 | 8164 |
| 5 | Push "volume up" button; current channel is 42 | 20080204 18:21:17 | 8164 |
| 6 | Push "channel down" button; current channel is 41 | 20080204 18:58:21 | 7206 |
| 7 | Push "channel down" button; current channel is 40 | 20080204 18:59:04 | 6738 |
| 8 | Push "channel down" button; current channel is 39 | 20080204 18:59:12 | 6827 |
| 9 | Push "channel down" button; current channel is 38 | 20080204 18:59:21 | 3856 |

TABLE 1-continued

Sample Entries of Action Logs for a Television

| Entry | Action | Timestamp | Video CID |
|---|---|---|---|
| 10 | Push "channel down" button; current channel is 37 | 20080204 18:59:24 | 1563 |
| 11 | Push "channel down" button; current channel is 36 | 20080204 18:59:30 | 2957 |
| ... | ... | ... | ... |
| n | Power off television | 20080204 22:37:15 | |

In addition, according to some embodiments, the action monitor 110 also logs information associated with the content of the videos that have been operated on the media device. Often, each piece of digital video may include metadata that describes the content and other characteristics of the video, and such metadata may be logged in the action logs 111 along with the timestamp and video CID. The content metadata may provide additional information with respect to the content of each piece of video and/or relationships among multiple pieces of video. For example, one piece of content data may indicate the genre or category, e.g., drama, comedy, documentary, thriller, etc., of the video, while another piece of content data may indicate the total running length of the video. Sometimes, multiple pieces of video may be related to each other, such as in the case of different episodes of the same program series, and a piece of content data may indicate that a particular piece of video is one of the episodes of the series. Keywords may also be included in the content data that provide description of the video content. In addition, the metadata may include information such as program producers and sponsors, actors and directors, etc.

Such metadata may be obtained from various sources. For example, some program data may be found in public databases and the action monitor 110 downloads the data as needed. Some program data may be supplied by the cable companies via their program guides. Some program data may be transmitted to the individual media devices along with the videos.

However, the action monitor 110 is not the only component that may be used to obtain the additional metadata or content information. According to some other embodiments, the additional content information the rating engine 130 is responsible for downloading the content information via the Internet during the rating process (described below).

The raw log data stored in the action logs 111 are analyzed to determine various video operations that have been performed on the media device. According to some embodiments, the data analysis is performed by an action analyzer 120, which functions as a preprocessor for the rule-driven rating engine 130. Alternatively, according to other embodiments, the analysis of the raw log data is performed by the rating engine 130 itself, in which case the raw log data is sent to the rating engine 130 directly.

Using the log entries shown in Table 1 as an example, the first entry shows that the television was powered on at 17:50:03, and the channel was set on channel 2. The program shown on channel 2 when the television was powered on had a CID 9165. The second entry shows that the television was turned to channel 3 at 17:53:15, because the user pushed the "channel up" button on the remote control device, and the program shown on channel 3 at the time had a CID 0371. From the first and second entries, it may be determined that the video CID 9165 was viewed for 3 minutes and 12 seconds.

The third entry shows that the television was turned to channel 6 at 17:59:32, because the user input the channel number 16 via the remote control device, and the program shown on channel 6 at the time had a CID 1573. From the second and third entries, it may be determined that the video CID 0371 was viewed for 6 minutes and 17 seconds.

The fourth entry shows that the television was turned to channel 42 at 18:05:51, and the program shown on channel 42 at the time had a CID 8164. From the third and fourth entries, it may be determined that the video CID 1573 was viewed for 6 minutes and 19 seconds.

The fifth entry shows that the sound volume of the television was turned up at 18:21:17, because the user pushed the "volume up" button on the remote control device. No channel change occurred in connection with this user action, and the television remained on channel 42, which still showed the same program that had a CID 8164.

The sixth entry shows that the television was turned to channel 41 at 18:58:21, because the user pushed the "channel down" button on the remote control device, and the program shown on channel 41 at the time had a CID 7206. From the fourth and sixth entries, it may be determined that the video CID 8164 was viewed for 52 minutes and 30 seconds, because the television remained on channel 15 for that period of time.

The seventh entry shows that television was turned to channel 40 at 18:59:04, and the program shown on channel 40 at the time had a CID 6738. From the sixth and seventh entries, it may be determined that the video CID 7206 was viewed for 43 seconds.

The eighth entry shows that television was turned to channel 39 at 18:59:12, and the program shown on channel 39 at the time had a CID 3856. From the seventh and eighth entries, it may be determined that the video CID 6738 was viewed for 8 seconds. And so on.

Thus, from there log entries, various device usage patterns with respect to operating videos on the media device may be inferred. For example, video CID 0371 and 1573 were viewed for relatively short periods of time, i.e., about 6 minutes, while video CID 8164 was viewed for a relatively long period of time, i.e., about 52 minutes. Similarly, video CIDs 6738, 6827, 3856, and 1563 were each viewed for less than 1 minute. If the additional content data indicates that video CID 8164 is an episode of a television program and has a total length of about 1 hour, this may indicate that the episode was viewed in its entirety or almost in its entirety. On the other hand, because video CID 0371 and 1573 were viewed for relatively short periods of time, such device usage pattern may indicate that video CID 0371 and 1573 are not programs that the user(s) of the television enjoyed greatly. For video CIDs 6738, 6827, 3856, and 1563, since they were each viewed for a few seconds, and the user was pushing the "channel down" button several times in a row, such actions may indicate that the user was channel-surfing during that time period. These user or device usage actions may then be used to rate each of the video CID.

As indicated above, the sample log entries shown in Table 1 describe video operations on a television. For different types of media devices supporting different video operations, the log entries may include different actions. For example, action logs 111 reflecting video operations performed on a video recording device may include entries associated with video recording actions, such as a video CID being recorded, i.e., pushing the "recording" button for live recording or inputting time and channel information for timed recording, or multiple episodes of a series of program being recorded over a period of time, e.g., throughout a season, or playing a recorded program, i.e., pushing the "play" button or selecting a piece of recorded video from the memory storage via a user interface provided by the media device. Action logs 111 reflecting a media device capable of downloading videos via the Internet may include entries associated with video downloading or uploading actions, such as staring and exiting a media application program on the device or selecting video functions from the application program. The following Table 2 shows some sample entries that may be found in an action log file 111 associated with a media device capable for recording and playback videos. These user actions are associated with recording videos and playing-back previously recorded videos.

TABLE 2

Sample Entries of Action Logs for a Video Recording/Playback Device

| Entry | Action | Timestamp | Video CID |
|---|---|---|---|
| 1 | Power on recorder | 20080213 14:58:23 | |
| 2 | Choose user menu | 20080213 14:58:29 | |
| 3 | Select a digital video stored in recorder's memory storage | 20080213 14:58:37 | 6491 |
| 4 | Push "play" button on the remote control device | 20080213 14:58:42 | 6491 |
| 5 | Push "fast forward" button on the remote control device | 20080213 15:00:06 | 6491 |
| 6 | Release "fast forward" button on the remote control device | 20080213 15:02:12 | 6491 |
| 7 | Push "fast reverse" button on the remote control device | 20080213 15:37:42 | 6491 |
| 8 | Release "fast reverse" button on the remote control device | 20080213 15:38:09 | 6491 |
| 9 | Push "stop" button on the remote control device | 20080213 17:22:51 | 6491 |
| ... | ... | ... | ... |
| 55 | Choose user menu | 20080215 20:03:13 | |
| 56 | Input scheduled recording data (start and stop time, channel) using the remote control device | 20080215 20:06:21 | 7105 |
| ... | ... | ... | ... |
| 140 | Input channel 3 via remote control | 20080217 08:58:31 | 4926 |
| 141 | Push "record" button on the remote control device | 20080217 08:59:45 | 4926 |
| 142 | Push "stop" button on the remote control device | 20080217 10:01:26 | 4926 |
| ... | ... | ... | ... |
| n | Power off television | 20080213 22:37:15 | |

According to some embodiments, the action analyzer 120 also functions as a filter for the rating engine 130 to filter out those row data entries from the action logs 111 that are not relevant to rating the video content, thus easing the processing demand on the rating engine 130. For example, when operating a media device, sometimes the user may perform actions that are not indicative with respect to how the user feels about the videos he or she was viewing or recording. Nevertheless, such actions may also be recorded in the action logs 111 by the action monitor 110. These entries may be filtered out by the action analyzer 120.

Again, using the log entries shown in Table 1 as an example, entries 6, 7, 8, 9, 10, and 11 show that the television user pushed the "channel down" button several times in a row and successively, only stopping at each channel, i.e., channels 41, 40, 39, 38, and 37, very briefly, i.e., several seconds. Such actions typically suggest that the television user was mostly likely channel-surfing at the time, and the fact that the user viewed each of the programs shown on these five channels only briefly should not be considered as an indication that the user did not like these programs. In this case, the ratings of the programs shown in these five channels, i.e., CIDs 7206, 6738, 6827, 3856, and 1563 respectively, should not be decreased based on these log entries. Thus, the action analyzer 120 may be implemented to ignore those log entries where the videos are only viewed for less than a predefined threshold period, such as 30 seconds or 1 minute. Such entries are not considered when adjusting the rating of the video content.

Similarly, sometimes a television may be left on for a long period of time while the user has walked away without turning off the television set. In this case, the television may be left on the same channel for hours before the user returns. However, since no one is actually watching the television during that time period, the fact that the programs shown on that channel run from the beginning to the end should not be considered as an indication that the user likes these programs. In this case, the ratings of the programs should not be increased. Thus, the action analyzer 120 may be implemented to ignore those log entries where no user actions are logged for a time period greater than a predefined threshold period, such as 3 hours, thereafter.

The filtering process may also be achieved using rating rules. According to other embodiments, instead of having the action analyzer 120 filter those log entries in the action logs 111 that are considered irrelevant to adjusting the video content ratings, different rating rules are designed to ignore such user actions when they are sent to the rating engine 130. For example, one rating rule may specify that if a piece of video is viewed for less than a first predefined threshold period or longer than a second predefined threshold period, then the content rating of the video is not changed.

Each of the user action and its associated video CID are sent to the rule-driven rating engine 130 so that the rating of the video CID may be adjusted based on the user action and in reference to the predefined rating rules 131. The rating rules 131 may be stored in any type of memory or storage on the media device, such as a file or a database, accessible to the rating engine 130. Each rating rule includes a device usage pattern that describes one or more user actions or device usage actions with respect to a video operation, and a rating action that indicates how the rating of a piece of video is to be adjusted when the user action(s) associated with a video CID infer(s) the device usage pattern. The following Table 3 shows some sample rating rules.

TABLE 3

Sample Rating Rules

| Rule | Description |
|---|---|
| | Favorite Show |
| Device Usage Pattern | Episode is viewed substantially "completely" (greater than a predefined threshold period, such as 80% or 90% of its total length), and in the last month two or more different episodes from the same series have also been viewed "completely" |
| Rating Action | Increase rating of all episodes of the program View to End |
| Device Usage Pattern | Video is viewed for a long period or to the end |
| Rating Action | Increase rating of the video Skip/Surf |
| Device Usage Pattern | Video is viewed for a short period and then switched to other video and video has not already been viewed previously |
| Rating Action | Decrease rating of the video |

TABLE 3-continued

Sample Rating Rules

| Rule Description | |
|---|---|
| New Season Pass | |
| Device Usage Pattern | A new season pass has been added for a program, which causes all episodes of the program being recorded during a season |
| Rating Action | Increase rating of all episodes of the program from the season |
| Remove Season Pass | |
| Device Usage Pattern | A season pass for a program has been removed, and the program still has remaining episodes to be broadcasted or aired |
| Rating Action | Decreasing rating of all episodes of the program from the season |
| Recorded Video | |
| Device Usage Pattern | Video is recorded live or via scheduled recording |
| Rating Action | Increase rating of the video |
| Repeated View | |
| Device Usage Pattern | Video is viewed for a long period or to the end for multiple times |
| Rating Action | Increase rating of the video |
| View Multiple Episodes | |
| Device Usage Pattern | Multiple episodes of a program are viewed |
| Rating Action | Increase rating of all episodes of the program |

Each of the rating rules shown in Table 3 describes a device usage pattern with respect to a video operation and indicates how the rating(s) of one or more pieces of video are to be adjusted when the device usage pattern is inferred from one or more user actions determined from the action logs 111.

For example, the first rule, "favorite show", is designed with respect to a program having multiple episodes, such as a television series. The device usage pattern indicates that an episode of the series has been viewed "completely", and that during the past month, other episodes of the same series have also been viewed "completely". The term "completely" is a rough estimate. It does not necessarily mean that each of the episodes must be viewed from the beginning all the way to the end. The rating rule may consider that if an episode has been viewed for a period greater than a predefined threshold period, such as 80% or 90% of its full length, then that episode is considered to have been viewed "completely". Of course, the threshold period may vary depending on the specific design of the rating rule. In this sense, each of the rating rules may be designed to include as much or as little flexibility as suitable to the actual requirements or needs of the rating system 100. If user actions determined from the action logs 111 infer the device usage pattern of the first rule, then the rule is invoked to increase each of the content ratings of all the episodes of this program, and each episode is identified by its CID. Alternatively, the rating action may specify that only those episodes of the program from the current season have their respective content ratings increase, while the older episodes from past seasons remain unchanged.

In addition, how much the ratings are actually increased depends on the actual implementation of the rating system 100 and may be further specified in the rating action for this rule. For example, the rating action may specify that the ratings of all the episodes in the program are increased by one level. Alternatively, the rating action may specify that the newer episodes, e.g., episodes broadcasted during the current season, have their respective ratings increased by two levels, while the older episodes, e.g., episodes broadcasted in the previous seasons, have their respective ratings increased by one level. Again, the rules may be very flexible so that they meet the requirements of different implementations of the rating system 100.

The second rule, "view to end", is designed with respect to an individual piece of video. The device usage pattern indicates that a piece of video is viewed for a long period of time or to its end. Again, the rule may be flexible to specify what is considered a long period of time, e.g., at least 90% of the total length, at least one hour, etc. If one or more user actions infer this device usage pattern, then the content rating of the piece of video associated with the user action(s) is increased. Again, the piece of video may be identified by its unique CID.

The third rule, "skip/surf", is also designed with respect to an individual piece of video. The device usage pattern indicates that a piece of video is viewed for a relatively short period of time, such as a few minutes, and the piece of video has not been viewed previously. If one or more user actions infer this device usage pattern, then the rating action specifies that the content rating of the piece of video associated with the user action(s) is decreased. Note that if the piece of video has been viewed previously, then the user may not wish to view it again, and may quickly switch to other programs. In this case, however, it may not be appropriate to decrease the rating of the piece of video simply because it was viewed for a short period of time. Thus, the rating rule is designed in such a way that if the video has been viewed previously, then its content rating is not affected by a device usage pattern that viewed the video for a relatively short period of time.

The individual rating rules are also designed corresponding to the types of media device, and more specifically, the types of video operations supported by the media device, on which the rating system 100 functions. Some rating rules are suitable for video viewing operations. For example, the above three rules are suitable for televisions and cable or set top boxes, where the users view video programs from different channels. Other rules, such as the next four rules, may be more suitable for media devices that support recording videos and viewing of the recorded videos.

The fourth rule, "new season pass", is designed with respect to a program having multiple episodes. The device usage pattern indicates that a new season pass has been added for a program, which causes all episodes of the program being recorded during an entire season. If one or more user actions infer this device usage pattern, then the content rating of every new episode of the program broadcasted during that season is increased. Alternatively, the rating action may specify that the content rating of all the episodes, i.e., episodes from different seasons, of the program be increased.

The fifth rule, "remove season pass", is also designed with respect to a program having multiple episodes. The device usage pattern indicates that a previously scheduled season pass for a program is removed, and the program still has remaining episodes to be aired during that season. If one or more user actions infer this device usage pattern, then the rating action specifies that the content rating of every new episode of the program broadcasted during that season is decreased. Alternatively, the rating action may specify that the content rating of all the episodes of the program be decreased.

The sixth rule, "recorded video", is designed with respect to an individual piece of video. The device usage pattern indicates that a piece of video is recorded live or via scheduled recording. If one or more user actions infer this device usage pattern, then the rating action specifies that the content rating of the piece of recorded video is increased.

The seventh rule, "repeated view", is designed with respect to an individual piece of video. The device usage pattern indicates that a piece of video is viewed for long periods of time or to its end for multiple times, i.e., the same piece of video has been viewed repeatedly. If one or more user actions infer this device usage pattern, then the rating action specifies that the rating of the piece of is increased.

The eighth rule, "view multiple episodes", is also designed with respect to a program having multiple episodes. The device usage pattern indicates that multiple episodes shown at different times from the same program series have been viewed. For example, a person may watch several or all of the episodes from a television series at the same time each week. If one or more user actions infer this device usage pattern, then the content rating of every new episode of the program broadcasted during that season is increased. Alternatively, the rating action may specify that the content rating of all the episodes, i.e., episodes from different seasons, of the program be increased.

Table 3 only shows a few samples of the rating rules. The rating rules 131 may be adjusted according to different types of media device and the video operations they support. New rules may be added to describe new video operations or new device usage patterns with respect to video operations. Furthermore, each rule may specify a different amount of rating adjustment. For example, one rule may specify that the rating of the video be adjust, i.e. increased or decreased, a greater amount than another rule. Some rule may specify that when its device usage pattern is inferred from user action(s), the rating of the video associated with the user action(s) be increased or decreased to maximum or minimum available level. Some rule may specify that the amount of the rating adjustment depends on the current content rating of the video being adjusted. If the video already has a content rating near the top or the bottom of the rating scale, then the amount of rating adjustment may be smaller than if the video has a rating near the middle of the rating scale.

Figure 3:
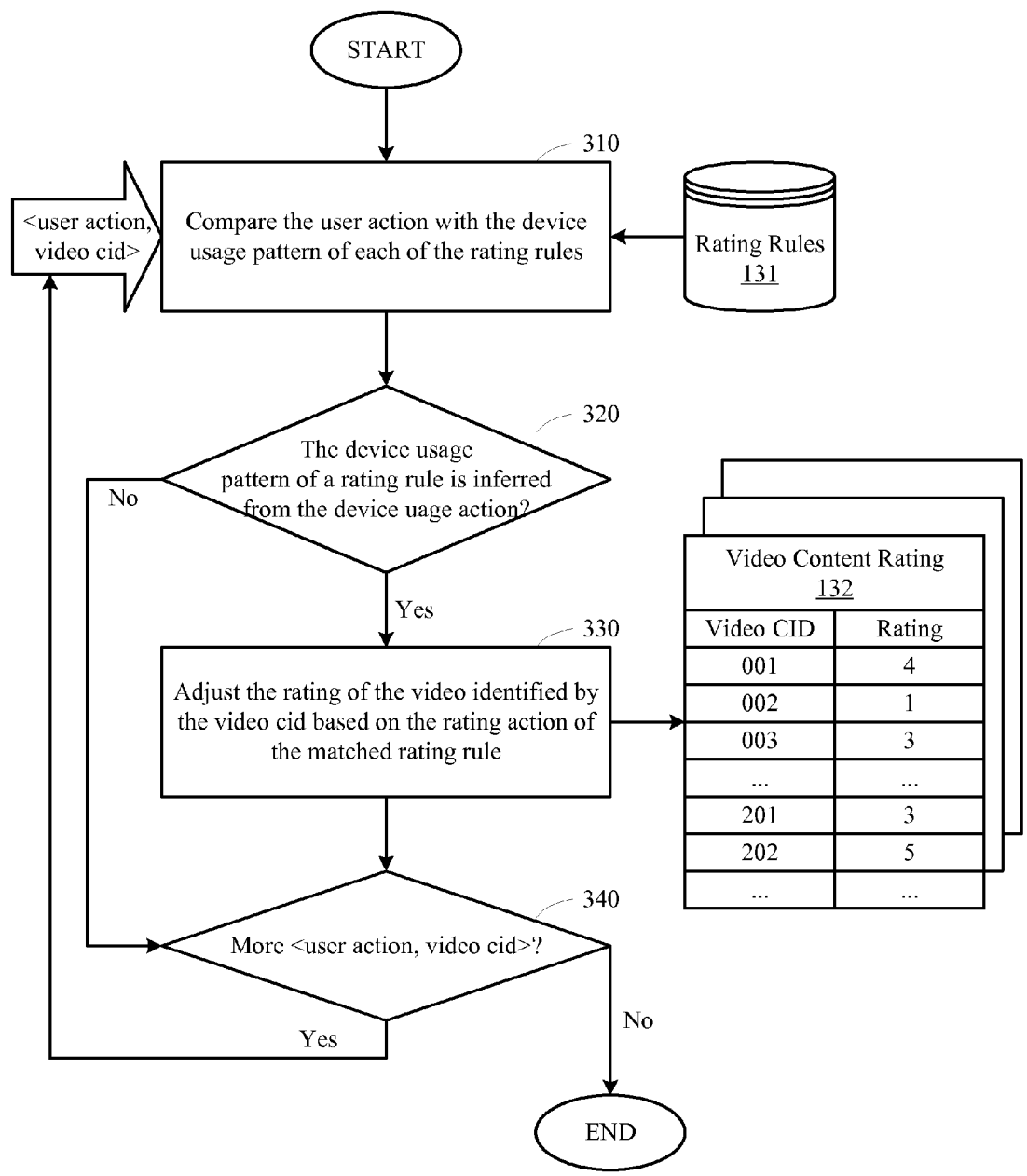
FIG. 3 illustrates a method of automatically rating the content of the videos that have been operated on a media device based on one or more predefined rating rules.

The functionalities of the rating engine 130 is described in more detail in FIG. 3, which illustrates a method of automatically rating the content of the videos that have been operated on a media device based on one or more predefined rating rules. As described above, according to some embodiments, the action analyzer 120 analyze the raw log data stored in the action logs 111 to determine user actions associated with videos identified by their respective CIDs. Each piece of video and its associated user action is sent to the rating engine 130 so that the rating of the video may be adjusted based on a rating rule 131.

The user action is compared with the device usage pattern of each of the rating rules 131 (step 310). If the device usage pattern of one of the rating rules 131 is inferred from the user action (step 320), then the rating rule is invoked and the rating of the piece of video associated with the user action and identified by the CID is automatically adjusted, e.g., increased or decreased, according to the rating action specified in that rating rule (step 330). The process repeats for each pair of user action and video CID determined from the action logs 111 (step 340).

A memory storage 132, e.g., a file, accessible by the rating engine 130 may be used to store the content ratings of the videos that have been operated on the media device. Each piece of video may be identified by its CID. Different rating systems, e.g., star system, rating scale, etc., may be used depending on the actual implementations of the rating system 100.

Since the ratings of the video content 132 are adjusted based on user actions with respect to operating those videos on the media device, the video content ratings 132 only reflect the opinions of the users actually using the media device. Furthermore, only videos that have been operated directly on the media device, e.g., viewed, recorded, or downloaded, are rated. In addition, the rating system 100 does not require users of the media device to manually specify their ratings for each piece of video. Instead, the content rating is automatically adjusted based on user actions or device usage with respect to these videos.

When a new piece of video is first operated on the media device, it may be assigned a default content rating. Each implementation of the rating system 100 may determine how to choose a default rating. For example, a default content rating may be the medium level on the rating scale. Thereafter, the content ratings of the videos may be automatically adjusted each time some user actions have occurred with respect to operating the videos on the media device.

According to some embodiments, the rating system 100 may include a video rating transmitter 140 that sends the content ratings of the videos on the media device to a server via the Internet from time to time, such as once a day, once a week, or once a month. The server may then combine video ratings collected from different media devices to determine overall ratings for the videos. To protect the privacy of the users of the media devices, the video ratings may be sent to the server anonymously, without any information identifying the sender devices or the users of the sender devices. Alternatively, according to some other embodiments, the video ratings are sent semi-anonymously, such as associated with a unique identifier that identifies the media device where the ratings come from. The ratings may be used to help providing video recommendations and/or choosing personalized advertisements to the device users.

Often, multiple users may use the same media device, and yet, one user or one group of users may have different tastes from another user or another group of users. For example, members of a family may watch the same television either together, i.e., at the same time, or individually, i.e., at different times. Children may watch child programs, e.g., animations, on weekend mornings, while adults may watch programs for mature audiences late at night. During early evenings, the entire family may watch programs together. Suppose a particular program was shown on the television at different times, e.g., in the morning and in the evening. When the program was shown in the morning, the viewers, e.g., the children of the family, who were watching the television at the time did not like the program and so they quickly switched to other programs. When the program was shown again in the evening, the adults of the family were watching the television and liked the program enough to watch it completely. Thus, the viewing actions from the two groups of television viewers, i.e., the children and the adults, provide different device usage patterns with respect to the same program. According to the rating rules 131, the children's viewing actions may cause the content rating of the program to be decreased, since they only watched the program for a very short period of time. On the other hand, the adults' viewing actions may cause the content rating of the program to be increased, since they watched the program completely.

To help avoid conflicts in device usage patterns among different users using the same media device, according to some embodiments, each piece of video that has been operated on the media device may have multiple content ratings, each rating reflecting device usage actions from a different time period. For example, in one embodiment, eight different time periods during a week may be represented: (1) weekday early-morning; (2) weekday daytime; (3) weekday evening; (4) weekday late-night; (5) weekend early-morning; (6) weekend daytime; (7) weekend evening; and (8) weekend late-night. Typically, Monday through Friday are considered "weekdays". Saturday and Sunday are considered "weekend". During a day, from 4:00 am to 9:59 am may be considered "early-morning", from 10:00 am to 5:59 pm may be considered "daytime", from 6:00 pm to 11:59 pm may be considered "evening", and from 12:00 am to 3:59 am may be considered "late-night". In this case, there may be multiple sets of content ratings, each corresponding to a different time period during which the media device has been used for video operations. For a particular set of content ratings, it only includes ratings for videos that have been operated on the media device during the corresponding time period. If the media device has never been used during a particular time period, then no video content rating is available for that time period.

In the above example where members of a family share the same television, suppose the children often view child programs on weekend mornings. The video content ratings corresponding to the "weekend early-morning" period may reflect the children's opinions more closely, since their device usage actions mainly influence the video content ratings for this time period. Similarly, suppose the adults often view programs for mature audiences late at night. The video content ratings corresponding to the "weekday late-night" and "weekend-late night" period may reflect the adults' opinions more closely. If the same program is shown at different times, then the specific content rating corresponding to a specific time period is adjusted based on the user actions during that time period.

Of course, the video content ratings may be divided according to any temporal specification. Different implementations of the rating system 100 may choose different time periods. For example, various embodiments may divide time periods based on days of the week, broadcasting seasons throughout the year, etc.

Various embodiments of the rating system 100 may be implemented as computer software programs or hardware components. For example, the various steps shown in FIGS. 2 and 3 may be implemented as computer software programs written in suitable software languages, and the computer code or instructions may be stored in computer-readable medium as a part of the rating system 100 to be executed on the media device.

Figure 4:
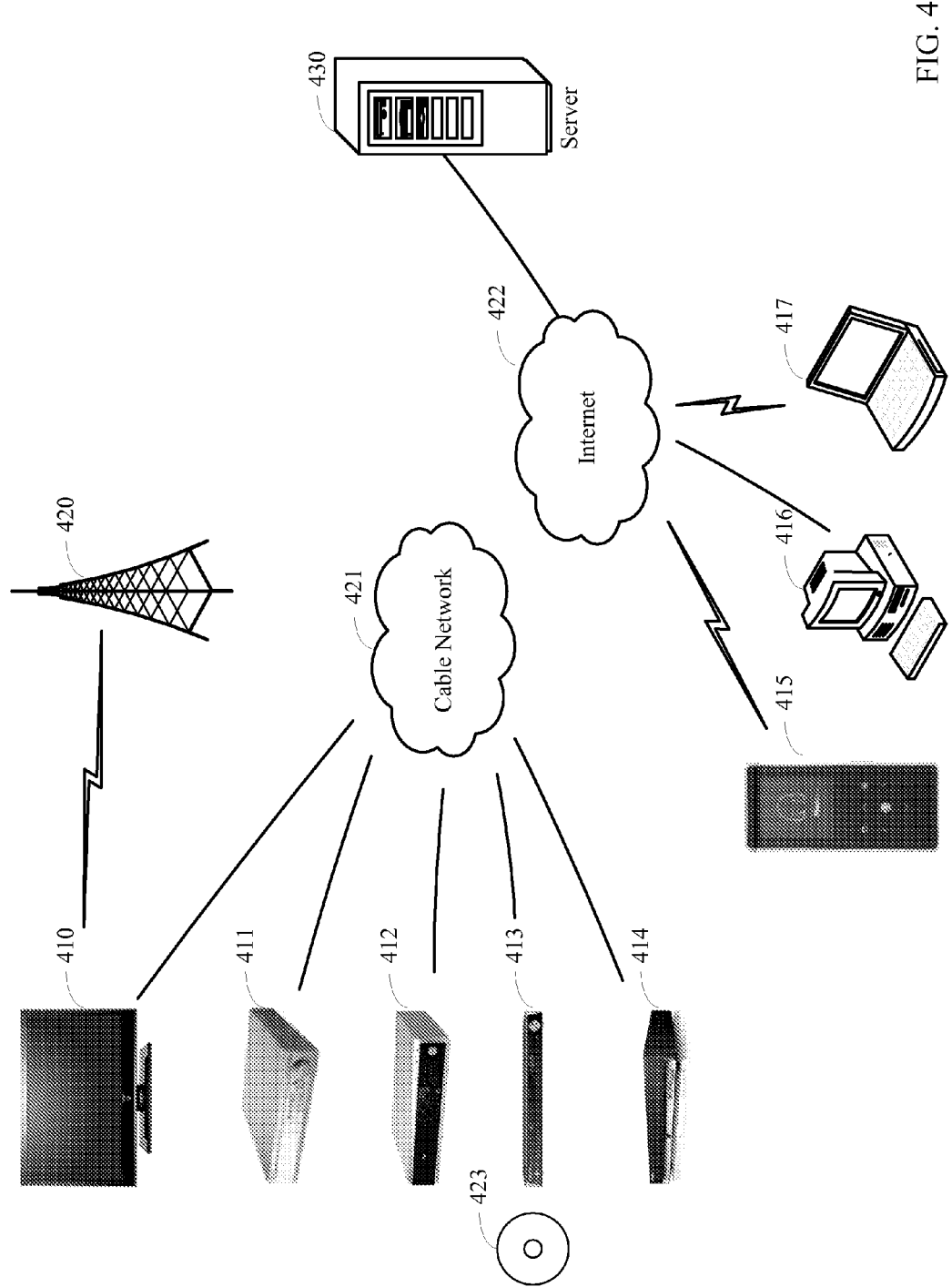
FIG. 4 is a simplified diagram of a network environment in which specific embodiments of the present invention may be implemented.

FIG. 4 is a simplified diagram of a network environment in which specific embodiments of the present invention may be implemented. The rating system 100 may be a part of different types of media devices capable of supporting various types of video operations, such as televisions 410, digital or analog video recorders 411, audio/video controllers 412, DVD players or VCRs 413, set top boxes 414, or portable media players 415. The rating system 100 may also be a part of different types of personal computers, such as desktop computers 416 of notebook computers 416.

The videos may come from different sources. Some may be broadcasted 420. Some may be delivered via dedicated cable networks 421. Some may be distributed on the Internet 422. Some may be recorded on various types of recording media, such as video discs 423 or cassettes. Some of the media devices, e.g., device 415, 416, and 417, may be capable of uploading video content rating data to a server 430 via the Internet 422.

According to some embodiments, each media device may have a controller that is responsible for controlling the video operations on the device. The controller may have different capabilities depending on the type of device, and may be implemented either as software programs or dedicated hardware components. For example, televisions may include tuners, video recorders may include recording components or storage, and media player and personal computer may include application programs for viewing and downloading videos.

The rating system described above automatically determines the content ratings of the videos that have been operated on a media device in the sense that users of the media device are not required to take any specific actions to rate these videos, such as in the case of, for example, Netflix, YouTube, or Amazon, where users need to manually select a rating level for each video. Instead, with the rating system described above, the device usage actions are monitored and used to adjust the video content ratings in reference to the rating rules without requiring user actions with respect to the rating process. The device usage actions are actions associated with performing video operations on the media device, not rating the video content.

The rating system, and especially the rating rules, has great flexibilities. Rating rules may be added, modified, or deleted as needed. Different rules may be designed for different types of media devices according to the types of video operations they support.

The automatic rating system may be used to help provide personalized video content to users of various types of consumer devices, such as televisions, video recorders, cable or set top boxes, and portable media players. System and methods for providing personalized video content are described in more detail in co-pending U.S. patent application Ser. No. 12/120,203, filed on May 13, 2008, entitled "A PERSONALIZED VIDEO SYSTEM" by Gibbs et al., which is hereby incorporated by reference in its entirety and for all intents and purposes. According to some embodiments, the video content ratings obtained from a specific consumer electronic device are used by a video content provider server to rank the pieces of video content selected for the user(s) of that consumer electronic device so that the selected pieces of video content are presented to the user(s) based on their ranks.

The ranking of pieces of video content for individual users is described in more detail in co-pending U.S. patent application Ser. No. 12/120,211, filed on May 13, 2008, entitled "COMBINATION OF COLLABORATIVE FILTERING AND CLIPRANK FOR PERSONALIZED MEDIA CONTENT RECOMMENDATION" by Nemeth et al. and co-pending U.S. patent application Ser. No. 12/120,209, filed on May 13, 2008, entitled "CLIPRANK: RANKING MEDIA CONTENT USING THEIR RELATIONSHIPS WITH END USERS" by Rathod et al., both of which are hereby incorporated by reference in their entireties and for all intents and purposes. According to some embodiments, the video content ratings obtained from a specific consumer electronic device are used obtain personalized ClipRank on a set of video content for the user(s) of that consumer electronic device.

While this invention has been described in terms of several preferred embodiments, there are alterations, permutations, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A consumer media device suitable for playing, recording, or controlling the playing or recording of video content, the consumer media device is one selected from a group consisting of a television, a VCR (video cassette recorder), a PVR (personal video recorder), a DVR (digital video recorder), an AV (audio/video) controller, a mobile multimedia player, a cable box, and a set top box, comprising:

a usage logger that automatically records selected user inputs to the consumer media device that are associated with at least one of playing and recording video content;

a rating engine that has a set of rating rules, the rating engine being arranged to apply the set of rating rules to automatically, without user interaction, generate content ratings associated with video content processed by the consumer media device based upon (1) the user inputs detected by the usage logger, (2) program guide information received by the consumer media device, and (3) the set of rating rules, wherein the rating engine automatically, without user interaction, generates content ratings for specific video content played for or recorded by or under the control of the consumer media device such that each rated piece of video content has an associated content rating, wherein the content ratings are generated locally by the rating engine without requiring the transmission of usage data to a centralized server and the generated content ratings are substantially independent of usage data, the rating engine automatically, without user interaction, adjusts the content rating associated with a rated piece of video content based on user action with the rated piece of video content directly on the media device; and a plurality of content ratings generated by the media device being automatically transmitted to the centralized server.

2. A consumer media device as recited in claim 1, further comprising:

a television tuner arranged to receive and play television programs on the consumer media device.

3. A consumer media device as recited in claim 1, further comprising:

a recording mechanism arranged to record video content; and a playback mechanism arranged to play the recorded video content on the consumer media device.

4. A consumer media device as recited in claim 1, wherein the set of rating rules comprises:

a first rule that generates or adjusts a rating for a particular piece of video content based at least in part upon a length of time that the video content is viewed on the consumer media device;

a second rule that generates or adjusts a rating for a particular piece of video content based at least in part upon a determination that multiple episodes of a related program have been viewed on the consumer media device; and a third rule that generates or adjusts a rating for a particular piece of video content based at least in part upon a determination that the particular piece of video content has been viewed multiple times.

5. A consumer media device as recited in claim 4, wherein the set of rating rules comprises:

a fourth rule that generates or adjusts a rating for a particular piece of video content based at least in part upon a determination that the video content is recorded on the consumer media device; and a fifth rule that generates or adjusts a rating for a particular piece of video content based at least in part upon a determination that multiple episodes of a related program have been recorded on the consumer media device.

6. A consumer media device as recited in claim 1, wherein each rated piece of video content has a plurality of content ratings corresponding to a plurality of time periods, such that a content rating of a rated piece of video content corresponding to a time period is adjusted based only on user inputs with respect to the rated piece of video content during the time period.

7. The consumer media device of claim 1 wherein the content ratings are automatically transmitted anonymously or semi-anonymously to the centralized server.

8. The consumer media device of claim 1 wherein the media device receives video via the Internet and content ratings are automatically transmitted anonymously or semi-anonymously to the centralized server via the Internet.

9. A media device capable of supporting video operations and automatically rating content of videos that have been operated on the media device, comprising:

a device usage monitor continuously monitors and automatically, without user interaction, records user inputted video control operations performed on the media device in a usage log;

a plurality of rating rules, wherein each rating rule includes a device usage pattern with respect to operating videos on the media device and a rating action indicating adjustments to content ratings of the videos based upon characteristics described by the device usage pattern that are inferred from the recorded user inputted video control operations;

a rating engine automatically, without user interaction, determines when the user inputted control operations infer a device usage pattern that falls within the scope of a particular one of the plurality of rating rules, thereby triggering the application of the particular rating rule, and automatically, without user interaction, adjusting a content rating of a piece of video based on a rating action associated with the particular rating rule when the device usage pattern of that rating rule is inferred from at least one video operation performed directly on the media device with respect to the piece of video, the rating engine automatically, without user interaction, adjusts the content rating associated with a rated piece of video based on user action with the rated piece of video directly on the media device; and a plurality of content ratings generated by the media device being automatically transmitted to a centralized server.

10. A media device as recited in claim 9, wherein the media device is selected from a group consisting of a television, a VCR (video cassette recorder), a PVR (personal video recorder), a DVR (digital video recorder), an AV (audio/video) controller, a mobile multimedia player, a cable box, and a set top box.

11. A media device as recited in claim 9, wherein the video operations supported by the media device are selected from a group consisting of viewing a piece of video, live recording of a piece of video, timed recording of a piece of video, downloading a piece of video, and transmitting a piece of video.

12. A media device as recited in claim 9, further comprising:

a controller controls the video operations supported by the media device.

13. A media device as recited in claim 9, wherein the plurality of rating rules include a first rule applicable to a series having a plurality of episodes being viewed at different times, such that
   the device usage pattern of the first rule describes that one of the plurality of episodes has been viewed for a time period that exceeds a predefined first threshold and during a month prior to viewing an episode, each of the others of the plurality of episodes has also been viewed for a time period that exceeds the predefined first threshold, and
   the rating action of the first rule indicates that a content rating of each of the plurality of episodes be increased.

14. A media device as recited in claim 13, wherein the plurality of rating rules include a second rule applicable to a piece of video, such that
   the device usage pattern of the second rule describes that the piece of video has been viewed for a time period that exceeds a predefined second threshold, and
   the rating action of the second rule indicates that a content rating of the piece of video be increased.

15. A media device as recited in claim 14, wherein the plurality of rating rules include a third rule applicable to a piece of video, such that
   the device usage pattern of the third rule describes that the piece of video has been viewed for a time period that is less than a predefined third threshold, and
   the rating action of the third rule indicates that a content rating of the piece of video be decreased.

16. A media device as recited in claim 15, wherein the plurality of rating rules include a fourth rule applicable to a series having a plurality of episodes being broadcasted at different times during a season, such that
   the device usage pattern of the fourth rule describes that every episode of the series is to be recorded during the season, and
   the rating action of the fourth rule indicates that a content rating of each of the plurality of episodes broadcasted during the season be increased.

17. A media device as recited in claim 16, wherein the plurality of rating rules include a fifth rule applicable to a series having a plurality of episodes being broadcasted at different times during a season, such that
   the device usage pattern of the fifth rule describes that a previous instruction to record every one of the plurality of episodes broadcasted during the season is deleted and at least one of the plurality of episodes has not yet been broadcasted, and
   the rating action of the fifth rule indicates that a content rating of each of the plurality of episodes broadcasted during the season be decreased.

18. A media device as recited in claim 17, wherein the plurality of rating rules include a sixth rule applicable to a piece of video, such that
   the device usage pattern of the sixth rule describes that the piece of video is recorded, and
   the rating action of the sixth rule indicates that a content rating of the piece of video be increased.

19. A media device as recited in claim 18, wherein the plurality of rating rules include a seventh rule applicable to a piece of video, such that
   the device usage pattern of the seventh rule describes that the piece of video is viewed more than once, and
   the rating action of the seventh rule indicates that a content rating of the piece of video be increased.

20. A media device as recited in claim 19, wherein the plurality of rating rules include a eighth rule applicable to a series having a plurality of episodes being broadcasted at different times, such that
   the device usage pattern of the eighth rule describes that the multiple episodes of the series are viewed, and
   the rating action of a fourth rule indicates that a content rating of each of the plurality of episodes be increased.

21. A media device as recited in claim 9, wherein each piece of video that has been operated on the media device has a plurality of content ratings corresponding to a plurality of time periods, such that a content rating of a piece of video corresponding to a time period is adjusted based only on video operations performed on the media device with respect to the piece of video during the time period.

22. A media device as recited in claim 21, wherein the plurality of time periods are selected from a group consisting of weekday early-morning, weekday daytime, weekday evening, weekday late-night, weekend early-morning, weekend daytime, weekend evening, and weekend late-night.

23. A media device as recited in claim 9, wherein the rating engine automatically adjusts the content rating of the piece of video based on content information associated with the piece of video received by the media device.

24. A system for automatically rating content of videos, wherein the system is a part of a consumer electronic device capable of allowing its users to view or record videos directly on the consumer electronic device, comprising:
   a device usage monitor continuously monitors and automatically, without user interaction, records user inputs that control video operations performed on the consumer electronic device in a usage log;
   a data analyzer analyzes the recorded video operations and determine at least one operation with respect to a piece of video performed on the consumer electronic device;
   a plurality of rating rules, wherein each of the plurality of rating rules includes a device usage pattern with respect to operating videos on the consumer electronic and a rating action;
   a rating engine compares the at least one operation with respect to the piece of video against the device usage pattern of each of the plurality of rating rules and automatically, without user interaction, adjusting a content rating of the piece of video based the rating action of one of the plurality of rating rules when the device usage pattern of that rating rule is inferred from the at least one operation with respect to the piece of video, wherein the content ratings are adjusted locally by the rating engine without requiring the transmission of usage data to a centralized server and the adjusted content ratings are substantially independent of usage data, the rating engine automatically, without user interaction, adjusts the content rating associated with a rated piece of video based on user action with the rated piece of video directly on the media device; and
   a plurality of content ratings generated by the media device being automatically transmitted to the centralized server.

25. The system of claim 24 wherein the content ratings are automatically transmitted anonymously or semi-anonymously to the centralized server.

26. The system of claim 24 wherein the media device is receives video via the Internet and content ratings are automatically transmitted anonymously or semi-anonymously to the centralized server via the Internet.

27. A method of automatically rating content of videos that have been operated on a media device capable of support video operations in reference to a plurality of rating rules, wherein each of the plurality of rating rules includes a device usage pattern with respect to operating videos on the media device and a rating action indicating content rating adjustments based upon characteristics described by the device usage pattern, comprising:

continuously monitoring and automatically, without user interaction, recording video operations performed on the media device in a usage log;

comparing locally, by a rating engine in the media device, at least one video operation performed directly on the media device with respect to a piece of video against the device usage pattern of each of the plurality of rating rules to generate a rating content for each piece of the video; and in response to the device usage pattern of one of the plurality of rating rules is inferred from the at least one video operation with respect to the piece of video such that characteristics of the at least one video operation falls within a scope of the device usage pattern, automatically, without user interaction, adjusting a content rating of the piece of video based on the rating action of that rating rule, wherein the content ratings is adjusted locally on the media device without requiring the transmission of usage data to a centralized server;

in response to the device usage pattern of one of the plurality of rating rules is inferred from the at least one video operation with respect to the piece of video, automatically adjusting a content rating of a second piece of video based on the rating action of that rating rule, wherein the second piece of video relates to the piece of video; and automatically transmitting a plurality of content ratings generated by the media device to the centralized server.

28. A method as recited in claim 27, wherein adjusting the content rating of the piece of video is one selected from a group consisting of increasing the content rating and decreasing the content rating.

29. A method as recited in claim 27, further comprising:
assigning a default content rating to a piece of video when the piece of video is initially operated on the media device.

30. A method as recited in claim 27, wherein the plurality of rating rules comprises:

a first rule that generates or adjusts a rating for a particular piece of video content based at least in part upon a length of time that the video content is viewed on the consumer media device;

a second rule that generates or adjusts a rating for a particular piece of video content based at least in part upon a determination that multiple episodes of a related program have been viewed on the consumer media device; and a third rule that generates or adjusts a rating for a particular piece of video content based at least in part upon a determination that the particular piece of video content has been viewed multiple times.

31. A method as recited in claim 30, wherein the plurality of rating rules comprises:

a fourth rule that generates or adjusts a rating for a particular piece of video content based at least in part upon a determination that the video content is recorded on the consumer media device;

a fifth rule that generates or adjusts a rating for a particular piece of video content based at least in part upon a determination that multiple episodes of a related program have been recorded on the consumer media device.

32. The method of claim 27 wherein the content ratings are automatically transmitted anonymously or semi-anonymously to the centralized server.

33. The method of claim 27 wherein the wherein video content is received via the Internet and content ratings are automatically transmitted anonymously or semi-anonymously to the centralized server via the Internet.

34. A computer program product for automatically rating content of videos that have been operated on a media device capable of support video operations in reference to a plurality of rating rules, wherein each of the plurality of rating rules includes a device usage pattern with respect to operating videos on the media device and a rating action indicating content rating adjustments based upon characteristics described by the device usage pattern, the computer program product comprising a non-transitory computer-readable medium having a plurality of computer program instructions stored therein, which are operable to cause at least one computing device to:

continuously monitor and automatically, without user interaction, record video operations performed on the media device in a usage log;

locally compare, by a rating engine in the media device, at least one video operation performed directly on the media device with respect to a piece of video against the device usage pattern of each of the plurality of rating rules; and in response to the device usage pattern of one of the plurality of rating rules is inferred from the at least one video operation with respect to the piece of video such that characteristics of the at least one video operation falls within a scope of the device usage pattern, automatically, without user interaction, adjust a content rating of the piece of video based on the rating action of that rating rule, wherein the content ratings is adjusted locally without requiring the transmission of usage data indicative of the recorded video operations to a centralized server;

in response to the device usage pattern of one of the plurality of rating rules is inferred from the at least one video operation with respect to the piece of video, automatically adjust a content rating of a second piece of video based on the rating action of that rating rule, wherein the second piece of video relates to the piece of video; and automatically transmitting a plurality of content ratings generated by the media device to the centralized server.

35. A computer program product as recited in claim 34, wherein adjusting the content rating of the piece of video is one selected from a group consisting of increasing the content rating and decreasing the content rating.

36. A computer program product as recited in claim 34, wherein the plurality of computer program instructions are further operable to cause at least one computing device to:
assign a default content rating to a piece of video when the piece of video is initially operated on the media device.

37. A computer program product as recited in claim 34, wherein the plurality of rating rules comprises:

a first rule that generates or adjusts a rating for a particular piece of video content based at least in part upon a length of time that the video content is viewed on the consumer media device;

a second rule that generates or adjusts a rating for a particular piece of video content based at least in part upon a determination that multiple episodes of a related program have been viewed on the consumer media device; and a third rule that generates or adjusts a rating for a particular piece of video content based at least in part upon a determination that the particular piece of video content has been viewed multiple times.

38. A computer program product as recited in claim 37, wherein the plurality of rating rules comprises:
a fourth rule that generates or adjusts a rating for a particular piece of video content based at least in part upon a determination that the video content is recorded on the consumer media device; and
fifth rule that generates or adjusts a rating for a particular piece of video content based at least in part upon a determination that multiple episodes of a related program have been recorded on the consumer media device.

39. The computer program product of claim 34 wherein the content ratings are automatically transmitted anonymously or semi-anonymously to the centralized server.

40. The computer program product of claim 34 wherein the media device receives video via the Internet and content ratings are automatically transmitted anonymously or semi-anonymously to the centralized server via the Internet.

* * * * *